United States Patent
Uchino

(10) Patent No.: US 7,914,832 B2
(45) Date of Patent: Mar. 29, 2011

(54) **METHOD FOR PRODUCING *CHLORELLA* FERMENTED FOOD**

(75) Inventor: Keijiro Uchino, Kizugawa (JP)

(73) Assignees: Kyoto Eiyo Co., Ltd., Kyoto (JP); Nippon Flour Mills Co., Ltd., Tokyo (JP)

( * ) Notice: Subject to any disclaimer, the term of this patent is extended or adjusted under 35 U.S.C. 154(b) by 581 days.

(21) Appl. No.: 11/806,670

(22) Filed: Jun. 1, 2007

(65) Prior Publication Data

US 2008/0299257 A1 Dec. 4, 2008

(51) Int. Cl.
*A23B 7/155* (2006.01)

(52) U.S. Cl. .................. 426/7; 426/49; 426/52; 426/60

(58) Field of Classification Search .......................... None
See application file for complete search history.

(56) References Cited

U.S. PATENT DOCUMENTS 3,389,998 A * 6/1968 Jorgensen ........................ 426/13
3,769,437 A * 10/1973 Pour-el et al. ................... 426/11

FOREIGN PATENT DOCUMENTS

| | | | |
|---|---|---|---|
| JP | 56-042572 | | 4/1981 |
| JP | 56-102773 | | 8/1981 |
| JP | 61-037088 | A | 2/1986 |
| JP | 61-257178 | | 11/1986 |
| JP | 09-322768 | A | 12/1997 |
| JP | 2002-218952 | A | 8/2002 |
| JP | 2003-88339 | A | 3/2003 |
| JP | 2005278601 | * | 10/2005 |
| KR | 2004-0052958 | | 6/2004 |
| TW | I 242412 | B | 5/2003 |

OTHER PUBLICATIONS

Economic Microbiology vol. 1 "Alcoholic Beverages" 1977 Academic Press, pp. 443, 444.*
Mehta et al. "Use of Ultraviolet Radiation to Achieve Bactera-Free Algal Culture" 1977 Proc. Okla. Acad. Sci. vol. 57 pp. 54-60.*
FAO "Procedure for Vegetables Preserved by Combined Methods" 2003 pp. 2,3,8,9.*

* cited by examiner

*Primary Examiner* — Timothy M Speer
*Assistant Examiner* — Felicia C King
(74) *Attorney, Agent, or Firm* — Rabin & Berdo, P.C.

(57) ABSTRACT

An object of the present invention is to provide a method for producing a *chlorella* fermented food in which a flavor and odor that are peculiar to algae are reduced while production of pheophorbide is suppressed. The method for producing a *chlorella* fermented food according to the present invention can be achieved by using a *chlorella* negative in coliform bacteria count, and having a content of free pheophorbide equal to or less than 18 mg % and a viable general bacteria count equal to or less than 8000 cfu/mL, or using a *chlorella* subjected to a heat sterilization treatment to ferment the *chlorella* with a baker's yeast. The baker's yeast is blended with the *chlorella* at a ratio of preferably 0.1 to 15% by weight. Further, the fermentation treatment is preferably carried out in the presence of glucose and a lactic acid bacterium.

7 Claims, No Drawings

METHOD FOR PRODUCING *CHLORELLA* FERMENTED FOOD

BACKGROUND OF THE INVENTION

1. Field of the Invention

The present invention relates to a method for producing a *chlorella* fermented food.

2. Description of the Related Art

*Chlorella* is a food which is rich in proteins, chlorophyll, dietary fibers, a variety of vitamins and minerals, and has been conventionally consumed as an alternative of green and yellow vegetables or a nutraceutical food.

However, *chlorella* has a peculiar algal odor, and is thus inferior in flavor, which may hamper the intake in a large amount or over a long period of time. In addition, when *chlorella* is degraded, there also arises a drawback in production of pheophorbide, which is a causative agent of photosensitivity, by means of an enzyme referred to as chlorophyllase included in chlorophyll.

On the other hand, a method for producing a *chlorella* enzyme in which *chlorella* is mixed with an enzyme stock solution containing yeast for fermentation under certain conditions has been so far proposed in Japanese Unexamined Patent Publication Nos. 9-322768 (1997) and 2002-218952; while a method for producing *chlorella* in which *chlorella* is mixed with a mixture of white rice malt (shiro-Koji) and a fermentation stock solution of vegetables, wild herbs and fruits which contains yeast for fermentation under certain conditions has been proposed in Japanese Unexamined Patent Publication No. 2003-88339.

However, the inventions described above relate to methods for processing an active ingredient of *chlorella* into a readily absorbable state, but do not intend to improve *chlorella* as a food which can be easily consumed. In particular, according to the inventions disclosed in Japanese Unexamined Patent Publication Nos. 9-322768 (1997) and 2002-218952, a solution containing yeast, mycobacterium, filamentous bacterium, lactic acid bacterium or the like is used as the enzyme stock solution, thereby leading to generation of a complicated fermentation flavor due to fermentation. Further, according to the invention disclosed in Japanese Unexamined Patent Publication No. 2003-88339, in addition to the flavor originated from the enzyme stock solution containing yeast, mycobacterium, filamentous bacterium, lactic acid bacterium or the like, a peculiar flavor originated from fermented substances such as vegetables is added to it. Therefore, in either case, ease in taking *chlorella* is unsatisfactory.

Further, the foregoing inventions have no consideration with respect to the fact that *chlorella* is a material which readily produces pheophorbide. Chlorophyllase which produces pheophorbide is an enzyme included not only in *chlorella* but in vegetables and the like. In addition, since the enzyme activity of chlorophyllase is increased by alcohol, sufficient care is primarily required for a variety of points, such as amount of chlorophyllase included in the entire system, composition of the enzyme stock solution mixed with *chlorella*, various factors which affect the enzyme activity of chlorophyllase (for example, alcohol produced with fermentation) and the like.

SUMMARY OF THE INVENTION

An object of the present invention is to provide a method for producing a *chlorella* fermented food in which a flavor and odor that are peculiar to algae are reduced while production of pheophorbide is suppressed.

In order to accomplish the aforementioned object, aspects of the present invention are to provide the following.

(1) A method for producing a *chlorella* fermented food, the method including using a *chlorella* negative in coliform bacteria count, the *chlorella* having a content of free pheophorbide equal to or less than 18 mg %, and a viable general bacteria count equal to or less than 8000 cfu/mL, and fermenting the *chlorella* with a baker's yeast.

(2) A method for producing a *chlorella* fermented food according to the above item (1), wherein the *chlorella* before fermentation with the baker's yeast is subjected to a washing treatment using water at 0 to 10° C.

(3) A method for producing a *chlorella* fermented food according to the above item (1), further including fermentation in the presence of a saccharide.

(4) A method for producing a *chlorella* fermented food according to the above item (1), further including fermentation in the presence of a lactic acid bacterium.

(5) A method for producing a *chlorella* fermented food according to the above item (1), wherein a blending amount of the baker's yeast is 0.1 to 15% by weight based on a blending amount of the *chlorella*.

(6) A method for producing a *chlorella* fermented food, the method including fermenting a *chlorella* subjected to a heat sterilization treatment with a baker's yeast.

(7) A method for producing a *chlorella* fermented food according to the above item (6), further including fermentation in the presence of a saccharide.

(8) A method for producing a *chlorella* fermented food according to the above item (6), further including fermentation in the presence of a lactic acid bacterium.

(9) A method for producing a *chlorella* fermented food according to the above item (6), wherein a blending amount of the baker's yeast is 0.1 to 15% by weight based on a blending amount of the *chlorella*.

In the present invention, the content (mg %) of free pheophorbide is measured in accordance with a process described in "Guidelines for Food Sanitation Inspection (Shokuhin Eisei Kensa Shishin); Physical and Chemical Research Part," JAPAN FOOD HYGIENE ASSOCIATION, pp. 289-290 (1991), "(a) Determination of Existing Pheophorbide." The specific process for measurement is as described below. *Chlorella* in an amount of 100 mg is extracted with 85% acetone. After adding ether thereto for separation, the ether layer is removed. The ether layer is extracted with 17% hydrochloric acid solution, and saturated sodium sulfate solution is added to the resulting hydrochloric acid solution, then the mixed solution is extracted with ether. The absorbance at 667 nm of the resulting ether layer is measured, and the amount of degradation product of chlorophyll is calculated from the absorbance measured based on the absorbance of standard pheophorbide a, whereby the calculated value is determined as the content of free pheophorbide (existing pheophorbide amount; unit: mg %).

In the present invention, a viable general bacteria count (cfu/mL) is measured in accordance with an official method in which a standard agar medium is used ("Guidelines for Food Sanitation Inspection; Microorganism Part," JAPAN FOOD HYGIENE ASSOCIATION, 1990). The specific process for the measurement is as in the following. There is added 90 mL of sterile water to 10 g of *chlorella*, and the resulting suspension is provided as a test solution. Then, the test solution is diluted appropriately, and is cultured in a standard agar medium at 35° C. for 24 to 48 hrs. Thereafter, the colony number in the dish is counted.

Furthermore, in the present invention, discrimination between negative and positive of the coliform bacteria count is determined in accordance with an official method in which a BGLB medium is used ("Guidelines for Food Sanitation Inspection; Microorganism Part," JAPAN FOOD HYGIENE ASSOCIATION, 1990). The specific process for the discrimination is as in the following. There is added 90 mL of sterile water to 10 g of *chlorella*, and the resulting suspension is provided as a test solution. Then, 1 mL of the resulting test solution is added to a BLGB medium housed in a Durham tube. After culturing at 35° C. for 24 to 48 hrs, generation of gas in the Durham tube is identified. In this step, the coliform bacteria count is determined as negative only in the case in which generation of the gas is not found.

According to the method for producing a *chlorella* fermented food of the present invention, fermenting *chlorella* with the baker's yeast can reduce flavor and odor that are peculiar to the algae and can provide a *chlorella* fermented food which is easily consumed.

Further, according to the method for producing a *chlorella* fermented food of the present invention, *chlorella* is previously subjected to a predetermined washing treatment for lowering the content of free pheophorbide, or to a heat sterilization treatment for deactivating chlorophyllase. In addition, production of alcohol accompanied by the fermentation can be suppressed as much as possible by carrying out the fermentation using the baker's yeast. Accordingly, activation of chlorophyllase accompanied by the fermentation treatment and production of pheophorbide can be suppressed.

DETAILED DESCRIPTION OF THE PREFERRED EMBODIMENT

A method for producing a *chlorella* fermented food according to a first aspect of the present invention is to use a *chlorella* adjusted to be negative in coliform bacteria count, to have a content of free pheophorbide equal to or less than 18 mg % and a viable general bacteria count equal to or less than 8000 cfu/mL, and to ferment the *chlorella* with a baker's yeast.

Furthermore, a method for producing a *chlorella* fermented food according to a second aspect of the present invention is to ferment a *chlorella* subjected to a heat sterilization treatment with a baker's yeast.

The *chlorella* raw material for use in the fermentation with the baker's yeast is not particularly limited, and for example, a variety of *chlorella* such as those prepared by culturing in a culture pond utilizing sunlight and in tank culture may be included.

Moreover, the *chlorella* raw material may have a higher content of various nutrients by, for example, setting of the culture conditions. Examples of the nutrient include e.g., iron, zinc, DHA (docosahexaenoic acid) and the like.

The *chlorella* raw material may be formed into powder by drying and pulverizing, or spray drying the *chlorella* that is subjected to the washing treatment as described above.

In the method for producing a *chlorella* fermented food according to the first aspect, for adjusting the free pheophorbide content of *chlorella* to be equal to or less than 18 mg %, for example, it is preferred to prevent the *chlorella* cell from dying as much as possible in each step of the culture, harvest, washing and concentration of the *chlorella*. When the *chlorella* cell dies, chlorophyllase which is an enzyme that produces pheophorbide is eluted, which may result in an increase in the free pheophorbide content, or contamination of free chlorophyllase in the *chlorella* raw material, or an increase in the pheophorbide content after the fermentation treatment (in the *chlorella* fermented food) may be raised.

One example of specific process for adjusting the free pheophorbide content of the *chlorella* to be equal to or less than 18 mg %, decreasing the viable general bacteria count to be equal to or less than 8000 cfu/mL, and adjusting the coliform bacteria count to be negative includes a process to wash cultured and harvested raw *chlorella* with water at 0 to 10° C. (preferably, with water at about 4° C.). The washing treatment is not limited thereto, but for example, a centrifugal separator or the like can be used.

It is preferred that the washing treatment of the *chlorella* be carried out more preferably at a temperature of 0 to 10° C. and with water having a sterilizing action in light of a decrease in viable general bacteria count, and adjustment of the coliform bacteria count to be negative. Examples of the water having the sterilizing action include e.g., electrolytic water (so-called strongly acidic water, acidic water, alkali water and strongly alkali water obtained by electrolysis of an aqueous solution of an electrolyte), water activated by an iron ion in the state of slight excitation (so-called $\pi$ water), ozone water, water containing a sterilizer (for example, hypochlorite or the like), and the like.

The free pheophorbide content of the *chlorella* raw material is equal to or less than 18 mg % as described above or preferably equal to or less than 10 mg %. The free pheophorbide content is normally increased by subjecting the *chlorella* to a fermentation treatment. Therefore, the free pheophorbide content of the *chlorella* raw material suspension before the fermentation treatment is set to fall within the above range in light of suppression of the free pheophorbide content of the *chlorella* fermented food.

By setting the free pheophorbide content of the *chlorella* (raw material) before the fermentation treatment to fall within the above range, the free pheophorbide content of the *chlorella* after the fermentation treatment (*chlorella* fermented food) can be set to be equal to or less than 60 mg %.

According to a notification by director general of the former Health and Welfare Ministry, Environmental Health Bureau (May 8, 1981) with respect to safety of *chlorella* processed products, the free pheophorbide content in *chlorella* processed products should not exceed 100 mg %, or total pheophorbide amount (described later) should not exceed 160 mg %. Further, in recent years, the standard value of *chlorella* processed products in the industry is set such that the free pheophorbide content in *chlorella* processed products is equal to or less than 60 mg %, and the total pheophorbide amount is equal to or less than 80 mg %.

Therefore, safety of *chlorella* fermented foods of the present invention can be improved by previously subjecting the *chlorella* before the fermentation treatment (raw material) to a treatment such that the free pheophorbide content thereof falls with in the above range.

The index to indicate the pheophorbide content, in addition to the aforementioned free pheophorbide content includes the total pheophorbide amount (mg %). The total pheophorbide amount (mg %) referred herein means the sum of the free pheophorbide content and the chlorophyllase activity. The chlorophyllase activity herein means the pheophorbide amount (mg %) increased by a reaction of the *chlorella* in a buffer (for example, a mixed solution of phosphate buffer-acetone) for 3 hrs. The total pheophorbide amount is measured as follows: a mixed solution of a phosphate buffer (pH 8.0) and acetone (volume ratio 7:3) is added to 100 mg of *chlorella* for fermentation at 37° C. for 3 hrs. Then, the resulting *chlorella* solution is adjusted to be weakly acidic with 10% hydrochloric acid solution to measure the amount in a similar manner to the measurement process of the free pheophorbide content.

The content of total pheophorbide of the *chlorella* after the fermentation treatment (*chlorella* fermented food) is, in terms of the standard value across the industry, equal to or less than 80 mg % as described above.

The viable general bacteria count of the *chlorella* raw material for fermentation with the baker's yeast is equal to or less than 8000 cfu/mL as described above or preferably equal to or less than 3000 cfu/mL. When the viable general bacteria count of the *chlorella* suspension that is a raw material of the *chlorella* fermented food is greater than 8000 cfu/mL, or the coliform bacteria count is positive, the *chlorella* fermented food is unsuitable for foods.

In the method for producing a *chlorella* fermented food according to the second aspect, examples of the heat sterilization treatment of *chlorella* include e.g., a variety of processes such as a blanching treatment with steam, but not limited thereto. The blanching treatment is not particularly limited, but may include a variety of blanching treatments such as steam blanching, blanching in hot water and the like.

The condition for heat sterilization treatment is not particularly limited, but the heat treatment temperature may be preferably 90 to 110° C., or more preferably 95 to 105° C., while the heat treatment time may be preferably 20 sec to 5 min, and more preferably 40 sec to 2 min.

Subjecting the raw material *chlorella* before the fermentation treatment to a heat sterilization treatment can deactivate chlorophyllase in the *chlorella*, to prevent an increase in the pheophorbide content after the fermentation treatment. Additionally, the heat sterilization treatment can kill saprophytic bacteria attached to the *chlorella*, whereby the viable general bacteria count and the coliform bacteria count can be lowered to fall within the above range in the stage prior to subjecting to the fermentation treatment.

In the method for producing a *chlorella* fermented food according to the first and the second aspects, when the *chlorella* raw material is formed into powder, the particle size of the *chlorella* powder is not particularly limited. However, normally, cell aggregation is found in *chlorella*, and the average particle diameter of the secondary particle is usually about 60 μm. When the aggregate is pulverized to adjust the average particle diameter of the secondary particles (50% particle size) to be 3.0 to 10 μm, the time period required for fermentation of the *chlorella* can be shortened, and as a result, the flavor, scent and texture of *chlorella* fermented food can be even further improved. Moreover, shortening the fermentation time can suppress production of pheophorbide by chlorophyllase remaining in the *chlorella* even more effectively.

The process for pulverizing the *chlorella* is not particularly limited, but includes a process such as pulverization using a stone mill, grind using an airstream grinding machine etc., and the like.

For the fermentation of the *chlorella*, a baker's yeast is used. Accordingly, production of alcohol accompanied by the fermentation can be suppressed as much as possible.

The baker's yeast is not particularly limited, but may include a variety of types of baker's yeasts that is available as yeast for foods.

The blending amount of the baker's yeast is 0.1 to 15% by weight, preferably 0.5 to 10% by weight, or more preferably 0.5 to 5.0% by weight based on the weight of the *chlorella*.

The condition for the fermentation treatment with the baker's yeast is not particularly limited, but the fermentation temperature is preferably 15 to 45° C., or more preferably 30 to 40° C., while the fermentation time is preferably 1 to 7 hrs, or more preferably 1.5 to 5 hrs.

It is preferred that the fermentation treatment with the baker's yeast be carried out in the presence of oxygen in light of suppression of production of the alcohol. Moreover, in light of suppression of production of alcohol, it is preferred that the moisture content of the *chlorella* in the fermentation treatment is set to fall within the range described below, or that the mixture including the *chlorella* and the baker's yeast is stirred sufficiently during the fermentation treatment.

The moisture content of the *chlorella* (i.e., percentage of the amount of moisture to the total amount of the *chlorella* including water) in the fermentation treatment is preferably 20 to 70% by weight, or more preferably 30 to 55% by weight. When the moisture content is set to fall within the above range, sufficient oxygen is supplied to the yeast, whereby production of alcohol can be suppressed.

For setting the moisture content of the *chlorella* to fall within the above range, the *chlorella* to be the raw material of the fermentation treatment may be prepared as a suspension in which it is dispersed in water. Further, the stirring of the *chlorella* in the fermentation treatment is not particularly limited, but the stirring may be carried out according to a common procedure.

The *chlorella* to be the raw material of the fermentation may not necessarily be fermented in the presence of oxygen since the chlorophyllase content is decreased sufficiently through the predetermined washing treatment, or the chlorophyllase activity thereof is lowered sufficiently through the heat sterilization treatment. For example, the fermentation can also be performed with liquid culture using the baker's yeast.

In the liquid culture, harvested and washed *chlorella* may be prepared in the form of a suspension having a solid content concentration of 5 to 25% by weight, or preferably 10 to 15% by weight, then the suspension may be subjected to a blanching treatment (repeatedly as needed). In the subsequent fermentation treatment with the baker's yeast, the fermentation may be performed through blending the baker's yeast in an amount falling within the range with respect to the *chlorella* solid content in the suspension.

In the case in which the *chlorella* is fermented with the baker's yeast, the flavor that is peculiar to the *chlorella* is improved, and the odor is reduced, in addition, nutritional ingredients such as proteins, carbohydrates, lipids and the like become more digestible and absorbable. Moreover, as is clear from the results of Examples described later, the content ratio of various micronutrients such as minerals is increased.

The fermentation of the *chlorella* is carried out preferably in the presence of a saccharide, or more preferably in the presence of a lactic acid bacterium.

The saccharide is not particularly limited, but may include glucose, trehalose, raffinose, fructose, sucrose, starch, a starch degradation product, syrup, blackstrap molasses, and the like. The saccharides may be used alone, or two or more thereof may be appropriately used and mixed ad libitum.

The fermentation of the *chlorella* in the presence of the saccharide facilitates the fermentation smoothly, whereby a time period required for the fermentation treatment can be shortened.

As the saccharide, among other examples shown above, glucose, or a combination of glucose and trehalose is preferred in light of the effect of accelerating the fermentation of the *chlorella*, and adjusting the flavor of the *chlorella* fermented foods. Trehalose has a high moisture retention, where by mixing with *chlorella* can uniformly blend moisture and *chlorella*.

The blending amount of saccharide may vary depending on the properties and type of the saccharide, such as monosaccharide, disaccharide, oligosaccharide, polysaccharide and the like, and is not particularly limited. However, the blending amount of glucose is, for example, preferably 0.5 to 2.0% by weight, or more preferably approximately 1% by weight based on the weight of the *chlorella*. Further, the blending amount of trehalose is preferably 0.1 to 5% by weight, or more preferably 0.5 to 2.0% by weight based on the weight of the *chlorella*.

The lactic acid bacterium is not particularly limited except that it should be an edible lactic acid bacterium, but includes *Bifidobacterium, Enterococcus, Lactobacillus* and the like.

The blending amount of the lactic acid bacterium is not particularly limited, but preferably 0.05 to 5.0% by weight, and more preferably 0.2 to 3.0% by weight based on the weight of the *chlorella*.

The *chlorella* fermented food may be formulated into a variety of known dosage forms such as, for example, powder, granule, or tablet depending on the purpose and applications.

Further, the *chlorella* fermented food obtained by the producing method of the present invention may be either formulated with the *chlorella* fermented food alone, or formulated with an excipient depending on the dosage form, purpose and applications. The blending ratio of the aforementioned *chlorella* fermented food with respect to the excipient may be selected appropriately from the range of 0.1 to 99% by weight.

EXAMPLES

Next, the present invention will be explained by way of Examples and Comparative Examples, but the present invention is not limited to the following Examples.

Test Example 1

Example 1

A *chlorella* cultured in a natural culture pond utilizing sunlight was subjected to a blanching treatment with steam at 100° C. for 1 min to perform a heat sterilization treatment, and then spray dried. The resulting *chlorella* powder was blended with a 0.05% by weight of a baker's yeast (dry yeast) and water, then mixed and kneaded. Accordingly, a mixture having a moisture content adjusted to be 40% by weight was obtained.

Next, the aforementioned mixture was left still at 35° C. for 3 hrs for fermentation. Additionally, the mixture was heated to dry at 110° C., thereby adjusting the moisture content to be equal to or less than 5% by weight to obtain a *chlorella* fermented substance.

Examples 2 to 8

*Chlorella* fermented substances were obtained in a similar manner to Example 1 except that the blending percentage of the baker's yeast based on the amount of the blended *chlorella* powder was altered to the percentage shown in Table 1 below.

Comparative Example 1

The *chlorella* cultured in a natural culture pond utilizing sunlight was subjected to heat sterilization by carrying out a blanching treatment with steam at 100° C. for 1 min, then spray dried. The resulting *chlorella* powder and water were kneaded, and the resulting mixture was heated to dry at 110° C., whereby the moisture content of the mixture was adjusted to be equal to or less than 5% by weight.

Evaluation of Taste and Odor

The *chlorella* fermented substances obtained in Examples 1 to 8, and the dried mixture obtained in Comparative Example 1 were actually tasted by five subjects (two adult males, and three adult females), and an interview regarding an evaluation on the flavor and odor was conducted. Accordingly, an average of the evaluation was calculated and compiled. The evaluation standards were as follows.

Flavor

Strong: Strong flavor of algae or yeast was sensed, and hardly edible.

Medium: Flavor of algae or yeast was sensed, but no drawbacks in eating were experienced.

Weak: Weak flavor of algae or yeast was sensed.

Slight: Slight flavor of algae or yeast was sensed.

None: Almost no flavor of algae or yeast was sensed.

Odor

Strong: Strong algal odor or yeast odor was sensed, and hardly edible.

Medium: Algal odor or yeast odor was sensed, but no drawbacks in eating were experienced.

Weak: Weak algal odor or yeast odor was sensed.

Slight: Slight algal odor or yeast odor was sensed.

None: Almost no algal odor or yeast odor was sensed.

The above evaluation results are shown in Table 1 below.

TABLE 1

| No. | Blending Amount of baker's yeast | Fermentation time | Flavor | Odor | Comprehensive evaluation |
|---|---|---|---|---|---|
| Comparative Example 1 | — | — | Algae: Strong Yeast: None | Algae: Strong Yeast: None | Not acceptable |
| Example 1 | 0.05% by weight | 3 hrs | Algae: Medium Yeast: None | Algae: Medium Yeast: None | Acceptable |
| Example 2 | 0.1% by weight | 3 hrs | Algae: Weak Yeast: None | Algae: Weak Yeast: None | Good |
| Example 3 | 0.5% by weight | 3 hrs | Algae: Slight Yeast: None | Algae: Slight Yeast: None | Excellent |
| Example 4 | 3.0% by weight | 3 hrs | Algae: Slight Yeast: None | Algae: None Yeast: Slight: | Excellent |
| Example 5 | 5.0% by weight | 3 hrs | Algae: None Yeast: Slight | Algae: None Yeast: Weak | Excellent |
| Example 6 | 10.0% by weight | 3 hrs | Algae: None Yeast: Weak | Algae: None Yeast: Medium | Good |
| Example 7 | 15.0% by weight | 3 hrs | Algae: None Yeast: Medium | Algae: None Yeast: Medium | Good |
| Example 8 | 16.0% by weight | 3 hrs | Algae: None Yeast: Medium | Algae: None Yeast: Medium | Acceptable |

In Table 1, the amount of the blended baker's yeast is represented by weight ratio (% by weight) based on the blended *chlorella* powder.

As is clear from the results shown in Table 1, by fermentation of the *chlorella* with the baker's yeast, the flavor and odor of the algae could be suppressed, and the *chlorella* fermented substance which can be easily consumed can be obtained. Moreover, the *chlorella* could be fermented within a comparatively short time period of 3 hours, and in addition, production of alcohol accompanied by the fermentation could also be suppressed, whereby production of pheophorbide could also be suppressed.

By setting the blending amount of the baker's yeast based on the amount of the blended *chlorella* to fall within the range of 0.1 to 15% by weight, the flavor and odor of both the algae and the yeast could be reduced. Furthermore, the results shown in Table 1 also revealed that the blending amount of the baker's yeast is particularly preferably 0.5 to 5% by weight in the range described above.

On the other hand, Comparative Example 1 in which no fermentation treatment with the baker's yeast was carried out had a drawback in that the flavor and odor of the algae was strong, and hardly edible.

Test Example 2

Example 9

The *chlorella* cultured in a natural culture pond utilizing sunlight was subjected to a blanching treatment with steam at 100° C. for 1 min to perform a heat sterilization treatment, and then spray dried. The resulting *chlorella* powder were blended with 3.0% by weight of the baker's yeast (dry yeast) and 1.0% by weight of trehalose, and water, then mixed and kneaded. Accordingly, a mixture having the moisture content adjusted to be 40% by weight was obtained.

Next, the aforementioned mixture was left still at 35° C. for 3 hrs for fermentation. Additionally, the mixture was heated to dry at 110° C., thereby adjusting the moisture content to be equal to or less than 5% by weight to obtain a *chlorella* fermented substance.

Example 10

A *chlorella* fermented substance was obtained in a similar manner to Example 9 except that glucose was blended in place of trehalose, and further, the fermentation time was changed from 3 hrs to 2 hrs. The amount of blended glucose was adjusted so as to be 1.0% by weight based on the amount of the blended *chlorella* powder.

Example 11

A *chlorella* fermented substance was obtained in a similar manner to Example 9 except that glucose was also blended together with trehalose, and further, the fermentation time was changed from 3 hrs to 2 hrs. The amount of blended trehalose and glucose was adjusted so as to be 1.0% by weight based on the amount of the blended *chlorella* powder, respectively.

Comparative Example 2

A *chlorella* fermented substance was obtained in a similar manner to Example 9 except that a beer yeast was blended in place of the baker's yeast, and fermentation was performed using the beer yeast.

Evaluation of Taste and Odor

The *chlorella* fermented substances obtained in Examples 9 to 11 and Comparative Example 2 were evaluated on taste and odor according to the same evaluation method and evaluation standards to those described above.

Evaluation of Pheophorbide Content

Total pheophorbide amounts (mg %) of the *chlorella* fermented substances obtained in Example 1, Examples 9 to 11 and Comparative Example 2, and the dried mixture obtained in Comparative Example 1 were measured, respectively. The process for measuring the total pheophorbide amount is as described above.

The results of evaluation and the results of measurement described above are shown in Table 2 below.

TABLE 2

| No. | Blending Amount of baker's yeast | Blending Amount of trehalose | Blending Amount of glucose | Total amount of pheophorbide |
| --- | --- | --- | --- | --- |
| Comparative Example 1 | — | — | — | 39.62 mg % |
| Example 1 | 3.0% by weight | — | — | 55.80 mg % |
| Example 9 | 3.0% by weight | 1.0% by weight | — | 49.60 mg % |
| Example 10 | 3.0% by weight | — | 1.0% by weight | 40.73 mg % |
| Example 11 | 3.0% by weight | 1.0% by weight | 1.0% by weight | 57.00 mg % |
| Comparative Example 2 | 3.0% by*1 weight | 1.0% by weight | 1.0% by weight | 350.88 mg % |

In Table 2, the amount of the baker's yeast, trehalose and glucose is each represented by weight ratio (% by weight) based on the blending amount of *chlorella* powder. Furthermore, the pheophorbide content (mg %) represents the content (mg) per 100 g of the *chlorella* fermented substance. In Comparative Example 2, beer yeast was used in place of the baker's yeast (*1).

During the fermentation treatment, fermentation with the baker's yeast proceeded smoothly in Examples 9 to 11 in which trehalose and/or glucose were/was blended, and the flavor and odor of the algae could be reduced in every Example. Because of the fermentation with the beer yeast in Comparative Example 2, the flavor was different from those of Examples fermented with the baker's yeast. However, Comparative Example 2 showed a tendency of reducing the flavor and odor of the algae.

Particularly, in Examples 10 and 11 in which glucose was blended, the effect of improving the flavor or odor of the algae could be sufficiently achieved irrespective of the shortened fermentation time from 3 hrs to 2 hrs. Additionally, in the Examples 9 and 10 in which trehalose was blended, not only the flavor and odor of the *chlorella* fermented substance was improved, but moisture retention could be imparted to the *chlorella* fermented substance, whereby a fermented substance having a moist texture could be obtained. Therefore, the processability was favorable in processing the *chlorella* fermented substance into tablets and the like.

With respect to the content of pheophorbide, since chlorophyllase in the *chlorella* could not be completely eliminated even in the case in which the blanching treatment was carried out, the content of pheophorbide increased slightly in Examples 1, 9, 10 and 11 accompanied by the fermentation treatment. However, the amount of an increase was extremely small.

On the other hand, when alcohol was produced by fermentation as in Comparative Example 2, an increase in the content of pheophorbide accompanied by the fermentation treatment was notable.

Test Example 3

Example 12

The *chlorella* cultured in a natural culture pond utilizing sunlight was subjected to a blanching treatment with steam at 100° C. for 1 min to perform a heat sterilization treatment, then pulverized and spray dried. The resulting *chlorella* powder were blended with 3.0% by weight of the baker's yeast (dry yeast), 1.0% by weight of raffinose and 1.0% by weight of glucose, and water, then mixed and kneaded. Accordingly, a mixture having the moisture content adjusted to be 40% by weight was obtained.

Next, the aforementioned mixture was left still at 35° C. for 3 hrs for fermentation. Additionally, the mixture was heated to dry at 110° C., thereby adjusting the moisture content to be equal to or less than 5% by weight to obtain a *chlorella* fermented substance.

With respect to the *chlorella* fermented substance of Example 12, and the mixture obtained in Comparative Example 1, their nutritional ingredients were analyzed. The results of analysis are shown in Table 3.

TABLE 3

| <Nutrients> | Comparative Example 1 | Example 12 |
|---|---|---|
| Calorie | 371 kcal | 400 kcal |
| Proteins | 62.10 g | 61.30 g |
| Lipids | 12.80 g | 11.80 g |
| Carbohydrates | 16.10 g | 16.40 g |
| Dietary fibers | 14.10 g | 15.00 g |
| Ash contents | 5.60 g | 6.90 g |
| Vitamin B1 | 2.18 mg | 2.14 mg |
| Vitamin B2 | 5.00 mg | 4.61 mg |
| Vitamin B6 | 2.31 mg | 1.76 mg |
| Niacin | 21.80 mg | 26.00 mg |
| Magnesium | 248.00 mg | 342.00 mg |

As is clear from the results of analysis shown in Table 3, it revealed that the content of minerals such as magnesium in the *chlorella* fermented substance was increased as compared with the *chlorella* which was subjected to only the blanching treatment.

Test Example 4

Example 13

The *chlorella* cultured in a natural culture pond utilizing sunlight was subjected to a blanching treatment with steam at 100° C. for 1 min to perform a heat sterilization treatment, and then spray dried. Furthermore, the resulting *chlorella* powder was pulverized with an airstream grinding machine to adjust the particle size to be approximately 3.0 to 10 μm.

Next, a *chlorella* fermented substance was obtained in a similar manner to Example 11 except that the resulting pulverized *chlorella* powder was used. More specifically, the pulverized *chlorella* powder was blended with 3.0% by weight of the baker's yeast, 1.0% by weight of trehalose, and 1.0% by weight of glucose, respectively, then mixed and kneaded. Accordingly, a mixture having the moisture content adjusted to be 40% by weight was obtained. Then, the aforementioned mixture was left still at 35° C. for 3 hrs for fermentation. Additionally, the mixture was heated to dry at 110° C., thereby adjusting the moisture content to be equal to or less than 5% by weight to obtain a *chlorella* fermented substance.

The resulting fermentation product was compared with the *chlorella* fermented substance obtained in Example 11. According to Example 13 in which the *chlorella* previously subjected to the pulverizing treatment, the flavor and odor of the algae in the *chlorella* fermented substance could be even further reduced and improved as compared with Example 11 irrespective of the fermentation conditions being the same.

Test Example 5

Example 14

The *chlorella* cultured in a natural culture pond utilizing sunlight was subjected to a blanching treatment with steam at 100° C. for 1 min to perform a heat sterilization treatment, then spray dried. The resulting *chlorella* powder were blended 3.0% by weight of the baker's yeast (dry yeast), 1.0% by weight of glucose and 1.0% by weight of a lactic acid bacterium (*Enterococcus faecium* FA-5), and water, then mixed and kneaded. Accordingly, a mixture having the moisture content adjusted to be 40% by weight was obtained.

Next, the aforementioned mixture was left still at 35° C. for 3 hrs for fermentation. Additionally, the mixture was heated to dry at 110° C., thereby adjusting the moisture content to be equal to or less than 5% by weight to obtain a *chlorella* fermented substance.

The flavor and the odor of the algae of the resulting *chlorella* fermented substance were both sufficiently reduced and improved. Moreover, the content of pheophorbide could be as low as 57 mg %.

Test Example 6

Example 15

A *chlorella* cultured in a natural culture pond utilizing sunlight was harvested, washed and concentrated so as to adjust the solid content to be 10% by weight. The resulting suspension was subjected to a blanching treatment with steam at 100° C. for 1 min to perform a heat sterilization treatment. Moreover, a part of the suspension after the blanching treatment was spray dried to obtain *chlorella* powder. This *chlorella* powder had a pheophorbide content of 35.27 mg %.

Next, the suspension after the blanching treatment was blended with 3.0% by weight of the baker's yeast, 1.0% by weight of glucose, and 1.0% by weight of a lactic acid bacterium, respectively, based on the *chlorella* solid content in this suspension. The resulting mixture was fermented by gently stirring at 35° C. for 3 hrs (liquid fermentation). Moreover, the suspension after the fermentation was subjected to a blanching treatment again with steam at 100° C. for 1 min to perform the heat sterilization treatment, and spray dried to give powder. The resulting *chlorella* fermented substance powder had a pheophorbide content of 39.42 mg %. Further, the flavor and the odor of the algae of the *chlorella* fermented substance were both sufficiently reduced and improved.

In Example 15, the pheophorbide content of the *chlorella* raw material (before the fermentation treatment) exceeds 18 mg %. However, chlorophyllase was deactivated by carrying out the heat sterilization treatment; therefore, even though a fermentation treatment is thereafter carried out, the content of chlorophyllase was not significantly increased, and the content of chlorophyllase in the *chlorella* fermented food could be much below 60 mg % (39.42 mg %).

Protein Digestion Test

Next, using the *chlorella* fermented substance obtained in Example 15 and unfermented substance in Comparative Example 1, protein digestibility was compared.

The test was carried out using four-week old Wistar rats in initiation of preliminary feeding (male, two groups in total, six rats per group), through the preliminary feeding period, the first period, the second period and the third period (seven days each) described below.

In the preliminary feeding period, the rats in each group ingested a pellet feed (Item No. "CE-2," manufactured by CLEA Japan, Inc.). In the first period and the third period, the rats in each group ingested "protein free feed" having the composition shown in Table 4 below, respectively. Further, in the second period, one group (group A) ingested "unfermented *chlorella* feed" having the composition shown in Table 4 below, while the other group (group B) ingested "fermented *chlorella* feed" having the composition shown in Table 4 below."

Compositions of ingredients in the protein free feed, the fermented *chlorella* feed and the unfermented *chlorella* feed are as shown below.

TABLE 4

| (Unit: part by weight) | Protein free feed | Unfermented chlorella feed | Fermented chlorella feed |
|---|---|---|---|
| Wheat flour | 88 | 72.3 | 72.3 |
| Unfermented *chlorella* (Blend of Comparative Example 1) | — | 20.6 | — |
| *Chlorella* fermented substance (Example 15) | — | — | 20.6 |
| Soybean oil | 5 | 4 | 4 |
| Inorganic salts *1 | 4 | 2.1 | 2.1 |
| Filter paper powder | 2 | 0 | 0 |
| Vitamin mixture *2 | 1 | 1 | 1 |
| Total amount | 100 | 100 | 100 |

In Table 4, a mixture IV of Philis-Hart was used as inorganic salts. Further, wheat flour was added to vitamin A: 50000 IU, vitamin $B_1$: 20 mg, nicotinamide: 200 mg, folic acid: 10 mg, vitamin $B_{12}$: 20 μg, vitamin E: 20 mg, vitamin $D_2$: 4000 IU, vitamin $B_2$: 30 mg, vitamin $B_6$: 80 mg, calcium pantothenate: 200 mg, vitamin C: 750 mg, vitamin K: 4 mg, choline chloride: 10 g and inositol: 1.0 g to prepare a total weight of 100 g, and used as a vitamin mixture.

Then, feces during the last three days in each feeding term were collected, and the amount of protein was measured according to a micro Kjeldahl method. Additionally, by concurrently measuring the amount of the feed consumption and amount of the protein, digestibility (%) of the protein was calculated (see, "Eiyou to Syokuryou" (Journal of Japanese Society of Food and Nutrition), Vol. 30, pp. 93-98 (1977)).

The results of the foregoing are shown in Table 5.

TABLE 5

| Specimen name | Protein digestibility |
|---|---|
| Group A (unfermented *chlorella* feed) | 78% |
| Group B (fermented *chlorella* feed) | 82% |

As is clear from the results of the analysis shown in Table 5, significant differences in protein digestibility were produced between the rats that ingested the fermented *chlorella* feed and the rats that ingested the unfermented *chlorella*, and the results were obtained that the protein digestibility was improved by ingestion of the fermented *chlorella* feed.

(Measurement of β-Glucan and γ-Aminobutyric Acid Content)

Furthermore, contents of β-glucan and γ-aminobutyric acid were compared using the *chlorella* fermented substance obtained in Example 15 and the unfermented substance of Comparative Example 1.

Method of Measurement of Content of β-Glucan

To samples collected from the *chlorella* fermented substance of Example 15 and the unfermented substance of Comparative Example 1, respectively, a phosphoric acid buffered solution (pH 6.0) was added and suspended. Thereafter, heat resistance amylase was added thereto, and the sample was digested by leaving to stand. Next, alkali was added thereto to adjust the pH to 7.5, and protease was added to digest the sample. Moreover, acid was added thereto to adjust the pH to 4.3, and amyloglucosidase was added to digest. The resulting digest was added with 95% ethanol, and the precipitate was filtered off. Next, after hydrolyzing with sulfuric acid the precipitate obtained by filtration, the mixture was neutralized, and the glucose content was measured. In addition, the content (mg %) of β-glucan was determined by the following formula using the measured value of the content of glucose.

β-Glucan Content(mg %)=Content of Glucose(g/100 g)×0.9

Method of Measurement of Content of γ-Aminobutyric Acid

The samples collected from the *chlorella* fermented substance of Example 15 and the unfermented substance of Comparative Example 1, respectively, were charged in a vessel, and 20% hydrochloric acid was added thereto, then the vessel was degassed and sealed. After hydrolyzing the samples in this manner, the content (mg %) of γ-aminobutyric acid in the sample was determined by measuring with an automatic amino acid analyzer.

The results in the foregoing are shown in Table 6.

TABLE 6

| Specimen name | β-glucan (mg %) | γ-aminobutyric acid (mg %) |
|---|---|---|
| Group A (Unfermented *chlorella*) | 700 | 8.0 |
| Group B (Fermented *chlorella*) | 900 | 21.0 |

As shown in Table 6, the results show that the contents of β-glucan and γ-aminobutyric acid were remarkably increased by carrying out the fermentation treatment. In other words, the results show not only the flavor and odor that are peculiar to *chlorella* can be improved by carrying out the fermentation treatment, but also effects of improvement of protein digestibility as well as increase in the content of physiologically functional components such as β-glucan and γ-aminobutyric acid can be achieved. Accordingly, the results confirm that the material can be converted into a more favorable product as foods.

Test Example 7

Example 16

Iron was added in a natural culture pond utilizing sunlight to culture a *chlorella*. The iron content of the resulting *chlorella* was equal to or greater than 300 mg %. In general, the iron content of *chlorella* cultured in a natural culture pond utilizing sunlight is 80 to 200 mg %. The *chlorella* having the iron content equal to or greater than 300 mg % was harvested, washed and concentrated to adjust the solid content in the suspension to be 10% by weight.

Next, the suspension was subjected to a blanching treatment with steam at 100° C. for 1 min, and the solid of the resulting suspension was added with 3.0% by weight of baker's yeast and 1.0% by weight of a lactic acid bacterium. The resulting mixture was fermented by gently stirring at 35° C. for 3 hrs. After the fermentation, the suspension was sterilized by heating with steam at 100° C. for 1 min, and spray dried to obtain *chlorella* powder.

The resulting *chlorella* powder had an iron content of 321.1 mg %. The flavor and odor that are peculiar to the algae were improved. Additionally, the *chlorella* powder had a pheophorbide content of 42.29 mg %, and the amount of increase in pheophorbide accompanied by the fermentation treatment could be remarkably minimized.

Example 17

Iron and zinc were added in a natural culture pond utilizing sunlight to culture a *chlorella*. The iron content in the resulting *chlorella* was equal to or greater than 300 mg % and the zinc content was equal to or greater than 200 mg %. In general, the zinc content of *chlorella* cultured in a natural culture pond utilizing sunlight is 2 to 4 mg %. The *chlorella* having the iron content equal to or greater than 300 mg % and the zinc content equal to or greater than 200 mg % was harvested, washed and concentrated to adjust the solid content in the suspension to be 10% by weight.

Next, *chlorella* powder was obtained by carrying out the blanching treatment, fermentation, heat sterilization and spray drying in a similar manner to Example 16 except that the aforementioned suspension was used.

The resulting *chlorella* powder had an iron content of 334.5 mg % and a zinc content of 287.7 mg %. The flavor and odor that are peculiar to the algae were improved. Additionally, the *chlorella* powder had a pheophorbide content of 42.29 mg %, and the amount of increase in pheophorbide accompanied by the fermentation treatment could be remarkably minimized.

Test Example 8

Comparative Example 3

A *chlorella* cultured in a natural culture pond utilizing sunlight was harvested, and a *chlorella* suspension (solid content: 10% by weight) having a free pheophorbide content of 0 mg % was obtained by repeating washing with water at 4° C. and concentration under cooling (4° C.).

Next, after heat sterilization by subjecting the suspension to a blanching treatment with steam at 100° C. for 1 min, spray drying was carried out to obtain *chlorella* powder.

Example 18

A *chlorella* suspension having a free pheophorbide content of 0 mg % obtained in a similar manner to Comparative Example 3 was subjected to heat sterilization by carrying out the blanching treatment with steam at 100° C. for 1 min. Next, 3.0% by weight of baker's yeast (dry yeast), 1.0% by weight of glucose and 1.0% by weight of a lactic acid bacterium (*Bifidobacterium longum* BB536), and water were blended in the *chlorella* suspension based on the solid content weight thereof. The resulting mixture was fermented by leaving to stand at 35° C. for 3 hrs. After sterilizing the resulting fermentation solution by heating with steam at 100° C. for 1 mm, spray drying was carried out to obtain powder of a *chlorella* fermented substance.

Example 19

Powder of a *chlorella* fermented substance was obtained by carrying out the blending of baker's yeast, glucose, lactic acid bacterium and water, fermentation, heat sterilization, and spray drying in a similar manner to Example 18 except that a *chlorella* suspension having a free pheophorbide content of 0 mg % obtained similarly to Comparative Example 3 was used and that the suspension was not subjected to the blanching treatment.

Example 20

A *chlorella* cultured in a natural culture pond utilizing sunlight was harvested, and a *chlorella* suspension having a solid content of 10% by weight was obtained by repeating washing with water at 4° C. and concentration under cooling (4° C.). The *chlorella* after the washing had a free pheophorbide content of 4 mg % because of setting of the number of times of the washing smaller than that in Comparative Example 3.

Powder of a *chlorella* fermented substance was obtained by carrying out the blending of baker's yeast, glucose, lactic acid bacterium and water, fermentation, heat sterilization, and spray drying in a similar manner to Example 18 except that the resulting suspension was used and that the suspension was not subjected to the blanching treatment.

Example 21

A *chlorella* cultured in a natural culture pond utilizing sunlight was harvested, and a *chlorella* suspension having a solid content of 10% by weight was obtained by repeating washing with water at 4° C. and concentration under cooling (4° C.). The *chlorella* after the washing had a free pheophorbide content of 5 mg % because of setting of the number of times of the washing smaller than that in Comparative Example 3.

Powder of a *chlorella* fermented substance was obtained by carrying out the blending of baker's yeast, glucose, lactic acid bacterium and water, fermentation, heat sterilization, and spray drying in a similar manner to Example 18 except that the resulting suspension was used and that the suspension was not subjected to the blanching treatment.

Example 22

A *chlorella* cultured in a natural culture pond utilizing sunlight was harvested, and a *chlorella* suspension having a solid content of 10% by weight was obtained by repeating washing with water at 4° C. and concentration under cooling (4° C.). The *chlorella* after the washing had a free pheophorbide content of 10 mg % because of setting of the number of times of the washing smaller than that in Comparative Example 3.

Powder of a *chlorella* fermented substance was obtained by carrying out the blending of baker's yeast, glucose, lactic acid bacterium and water, fermentation, heat sterilization, and spray drying in a similar manner to Example 18 except that the resulting suspension was used and that the suspension was not subjected to the blanching treatment.

Comparative Example 4

A *chlorella* cultured in a natural culture pond utilizing sunlight was harvested, and a *chlorella* suspension having a solid content of 10% by weight was obtained by repeating washing with water at 4° C. and concentration under cooling (4° C.). The *chlorella* after the washing had a free pheophorbide content of 20 mg % because of setting of the number of times of the washing smaller than that in Comparative Example 3.

Powder of a *chlorella* fermented substance was obtained by carrying out the blending of baker's yeast, glucose, lactic acid bacterium and water, fermentation, heat sterilization, and spray drying in a similar manner to Example 18 except that the resulting suspension was used and that the suspension was not subjected to the blanching treatment.

Evaluation of Pheophorbide Content

With respect to Examples 18 to 22 and Comparative Examples 3 to 4, free pheophorbide content (mg %) and total pheophorbide content (mg %) were measured in the *chlorella* suspension after the washing treatment. The processes for measuring the free pheophorbide content (mg %) and the total pheophorbide content (mg %) are both as described above.

Further, free pheophorbide content (mg %) and total pheophorbide content (mg %) were measured on the *chlorella* fermented substances (Examples 18 to 22 and Comparative Example 4), and the *chlorella* suspension after the heat sterilization treatment (Comparative Example 3).

(Evaluation of Chlorophyll Content)

From the *chlorella* fermented substances (powder) obtained in Examples 18 to 22 and Comparative Example 4, and *chlorella* powder obtained in Comparative Example 3, samples were collected each in an amount of 5 to 10 mg, and 10 mL of water was added to each sample and left to stand for 30 min while being stirred intermittently. Subsequently, 5 mL of an alkaline pyridine solution was added to the resulting suspension, and left to stand for 15 min. Thereafter, the mixture was subjected to centrifugal separation to collect the supernatant. Next, to the residue after the centrifugal separation, 3 mL of the alkaline pyridine solution was added. After leaving to stand for 15 min, centrifugal separation was carried out to collect the supernatant, which was mixed with the supernatant obtained previously. Furthermore, the treatment similar to that described above was repeated on the residue after the centrifugal separation to give the total volume of the supernatant of 10 mL. To the alkaline pyridine solution described above, 1.4 g of sodium hydroxide, 16.6 g of pyridine, and water were added to prepare a total volume of 100 mL for use.

Subsequently, absorbance $E_{419}$ at a wavelength of 419 nm, and absorbance $E_{454}$ at a wavelength of 454 nm of the supernatant were measured, and the content (μg) of chlorophyll per mg of the sample was calculated by the following formula (1).

The absorbances $E_{419}$ and $E_{454}$ are values calculated by the following formula (2) using transmitted beam intensity $I_0$ of the blank cell, and transmitted beam intensity I of the sample cell at respective measurement wavelengths.

$$\text{Chlorophyll content}(\mu g/mg) = \{8.970 \times (7.19 \times E_{419} + 3.33 \times E_{454})\}/\text{Weight of measured sample(mg)} \quad (1)$$

$$E_{419}(\text{or } E_{454}) = \log(I_0/I) \quad (2)$$

Evaluation of Flavor

Evaluation of the *chlorella* fermented substances obtained in Examples 18 to 22 and Comparative Example 4, and the *chlorella* suspension after the heat sterilization treatment obtained in Comparative Example 3 were made on the flavor and odor in actual consumption. For the evaluation, a two-point scale was scored; B representing the case in which a seaweed odor originally included in *chlorella* significantly was left; and A representing the case of reduced seaweed odor, which is hardly sensed.

The results of the foregoing are shown in Table 7.

TABLE 7

| No. | Blanching treatment | Fermentation treatment | Heat sterilization | Pheophorbide Content (mg %) | | | | Chlorophyll Content (g %) | Flavor |
|---|---|---|---|---|---|---|---|---|---|
| | | | | Before washing | | After Fermentation | | | |
| | | | | Free | Total | Free | Total | | |
| Comparative Example 3 | None | None | Performed | 0 | 15 | 0 | 18 | 2.79 | B |
| Example 18 | Performed | Performed | Performed | 0 | 15 | 21 | 25 | 1.94 | A |
| Example 19 | None | Performed | Performed | 0 | 15 | 16 | 31 | 2.73 | A |
| Example 20 | None | Performed | Performed | 4 | 15 | 21 | 35 | 2.75 | A |
| Example 21 | None | Performed | Performed | 5 | 17 | 50 | 58 | 2.79 | A |
| Example 22 | None | Performed | Performed | 10 | 20 | 40 | 75 | 2.70 | A |
| Comparative Example 4 | None | Performed | Performed | 20 | 25 | 60 | 80 | 2.69 | A |

In Table 7, "total" of "pheophorbide content" indicates "total pheophorbide amount (mg %)." Furthermore, the chlorophyll content is a value converted into "g %."

As shown in Table 7, by lowering the free pheophorbide content of the *chlorella* suspension to 10 mg % before the fermentation treatment, a *chlorella* fermented substance having a low pheophorbide content (specifically, free pheophorbide content equal to or less than 60 mg %, and the total pheophorbide amount equal to or less than 80 mg % after the fermentation treatment) could be obtained without need for carrying out the blanching treatment before the fermentation treatment.

Further, comparison of Example 18 with Examples 19 to 22 shows that the chlorophyll content could be maintained even after the fermentation treatment and the heat sterilization treatment by omitting the blanching treatment before the fermentation treatment.

The *chlorella* fermented substances of Examples 18 to 22 and Comparative Example 4, and the mixture of Comparative Example 3 all had a viable general bacteria count equal to or less than 3000 cfu/mL, and a negative coliform bacteria count.

Test Example 9

A *chlorella* cultured in a natural culture pond utilizing sunlight was harvested, washed and concentrated so as to adjust the solid content to be 10% by weight. Furthermore, the resulting suspension was washed with water at 4° C. repeatedly under cooling (4° C.). In this step, by regulating the number of times of the washing appropriately, a total of three types of the sample (*chlorella* suspension) were prepared: Sample 1 having a viable general bacteria count after the washing of less than 300 cfu/mL; Sample 2 having a viable general bacteria count after the washing of about 3000 cfu/mL; and Sample 3 having a viable general bacteria count after the washing of about 10000 cfu/mL.

Next, 3.0% by weight of baker's yeast (dry yeast), 1.0% by weight of glucose and 1.0% by weight of lactic acid bacterium (*Bifidobacterium longum* BB536), and water were blended based on the solid content of *chlorella* in the *chlorella* suspensions of the aforementioned Samples 1 to 3, respectively. Accordingly, the resulting mixture was fermented by leaving still at 35° C. for 3 hrs. By sterilization through heating the resulting fermentation solution with steam at 100° C. for 1 min, and spray drying, a *chlorella* fermented substance was obtained while adjusting the *chlorella* moisture content to be equal to or less than 5% by weight.

Among the aforementioned *chlorella* fermented substances, the seaweed odor of the *chlorella* and the fermentation odor were sensed from the suspension after the fermentation treatment of one prepared from Sample 1 as a raw material. However, after the spray drying, these odors were extensively improved.

On the other hand, the seaweed odor of the *chlorella* and the fermentation odor were sensed from the *chlorella* fermented substance prepared from Sample 2 as a raw material for both the suspension after the fermentation treatment, and the *chlorella* fermented substance after the spray drying. However, the odors in all cases were acceptable in practical use as a food.

Moreover, with respect to the *chlorella* fermented substance prepared from Sample 3 as a raw material, putrid smells were sensed in either of the suspension after the fermentation treatment, and the *chlorella* fermented substance after the spray drying.

Production Example

Production Example 1

Each 30 kg of the *chlorella* fermented substances obtained in Example 1 and Example 14, and 0.15 kg of xanthan gum as an excipient (binder) were charged in a blower granulating machine, and formed into granules.

The resulting granules both had no flavor and odor of the algae and good taste, and were easy to eat.

Production Example 2

The *chlorella* fermented substances obtained in Example 1 and Example 14 each were formed with a tablet press to produce circular tablets (200 mg per tablet).

The resulting tablets both had no flavor and odor of the algae and good taste, and were easy to eat.

The method for producing a *chlorella* fermented food of the present invention is preferable as a method for producing a *chlorella* fermented food which can be easily consumed in a simple process.

The foregoing invention has been provided in terms of illustrative embodiments of the present invention. However, it is merely an illustration, but should not be construed as limiting the invention. Modification examples of the present invention that are apparent to persons skilled in the technical field of the present invention are included in the attached claims.

This application corresponds to Japanese Patent Application No. 2004-347257 filed on Nov. 30, 2004 with Japan Patent Office, and Japanese Patent Application No. 2005-240251 filed on Aug. 22, 2005 with Japan Patent Office, and the disclosures of these applications are herein incorporated by reference in their entirety.

What is claimed is:

1. A method for producing a *chlorella* fermented food, comprising the steps of:
   providing a *chlorella* that is negative in coliform bacteria count, that has a content of free pheophorbide equal to or less than 18 mg %, and that has a viable general bacteria count equal to or less than 8000 cfu/mL to provide a select chlorella to be fermented; and
   fermenting said *chlorella* to be fermented with from 0.5 to 5.0% by weight, based on weight of the *chlorella*, of a baker's yeast to provide the *chlorella* fermented food,
   wherein the *chlorella* has a moisture content during fermenting of 30 to 55% by weight, and
   wherein fermenting takes place in the presence of a lactic acid bacterium so that baker's yeast fermentation and lactic acid fermentation are performed simultaneously.

2. The method for producing a *chlorella* fermented food according to claim 1, wherein the *chlorella* before fermentation with the bakers yeast is subjected to a washing treatment using water at a temperature of 0 to 10° C.

3. The method for producing a *chlorella* fermented food according to claim 1, wherein fermenting takes place in the presence of a saccharide.

4. A method for producing a *chlorella* fermented food, comprising the steps of:
   providing a *chlorella* that has been subjected to a heat sterilization treatment to provide a heat sterilized *chlorella*;
   fermenting the heat sterilized *chlorella* with from 0.5 to 5.0% by weight, based on weight of the *chlorella*, of a baker's yeast to provide the *chlorella* fermented food,
   wherein the *chlorella* has a moisture content during fermenting of 30 to 55% by weight, and
   wherein fermenting takes place in the presence of a lactic acid bacterium so that baker's yeast fermentation and lactic acid fermentation are performed simultaneously.

5. The method for producing a *chlorella* fermented food according to claim 4, wherein fermenting takes place in the presence of a saccharide.

6. The method for producing a *chlorella* fermented food according to claim 1, wherein the *chlorella* fermented with the baker's yeast is a suspension having a solids content concentration of 10 to 15% by weight.

7. The method for producing a *chlorella* fermented food according to claim 4, wherein the heat sterilized *chlorella* fermented with the baker's yeast is a suspension having a solids content concentration of 10 to 15% by weight.

* * * * *

UNITED STATES PATENT AND TRADEMARK OFFICE
CERTIFICATE OF CORRECTION

PATENT NO. : 7,914,832 B2  Page 1 of 1
APPLICATION NO. : 11/806670
DATED : March 29, 2011
INVENTOR(S) : Keijiro Uchino It is certified that error appears in the above-identified patent and that said Letters Patent is hereby corrected as shown below:

Claim 1, column 20, line 23, change "select chlorella" to -- *chlorella* --;

Claim 2, column 20, line 34, change "bakers yeast" to -- baker's yeast --.

Signed and Sealed this
Sixteenth Day of August, 2011

David J. Kappos
*Director of the United States Patent and Trademark Office*